(12) United States Patent
Nagypal et al.

(10) Patent No.: US 11,592,089 B2
(45) Date of Patent: Feb. 28, 2023

(54) BALL SCREW AND SPINDLE NUT THEREFOR

(71) Applicant: SFS intec Holding AG, Heerbrugg (CH)

(72) Inventors: Andras Nagypal, Buchs (CH); Stefan Frei, Chur (CH); David Fischlin, Hinterforst (CH); Marijo Zach, Widnau (CH)

(73) Assignee: SFS Group International AG, Heerbrugg (CH)

( * ) Notice: Subject to any disclaimer, the term of this patent is extended or adjusted under 35 U.S.C. 154(b) by 0 days.

(21) Appl. No.: 17/481,444

(22) Filed: Sep. 22, 2021

(65) Prior Publication Data

US 2022/0090660 A1    Mar. 24, 2022

(30) Foreign Application Priority Data

Sep. 22, 2020  (EP) .................................... 20197576

(51) Int. Cl.
*F16H 25/20* (2006.01)
*F16H 25/22* (2006.01)

(52) U.S. Cl.
CPC ................................ *F16H 25/2223* (2013.01)

(58) Field of Classification Search
CPC ............. F16H 25/2223; F16H 25/2228; F16H 25/2204; F16H 25/22
See application file for complete search history.

(56) References Cited

U.S. PATENT DOCUMENTS

| | | | | |
|---|---|---|---|---|
| 4,074,587 A * | 2/1978 | Brusasco | ............ | F16H 25/2427 74/424.77 |
| 2003/0196504 A1* | 10/2003 | Watanabe | ........... | F16H 25/2214 74/424.82 |
| 2005/0087031 A1* | 4/2005 | Ohkubo | .............. | F16H 25/2223 74/424.82 |
| 2008/0127763 A1* | 6/2008 | Minakuti | ............ | F16H 25/2214 74/424.87 |

FOREIGN PATENT DOCUMENTS

| | | |
|---|---|---|
| DE | 3635212 | 4/1988 |
| DE | 102004025683 | 12/2005 |
| DE | 102011076438 | 3/2020 |
| EP | 3499089 | 6/2019 |
| JP | 2001141019 | 5/2001 |

* cited by examiner

*Primary Examiner* — Zakaria Elahmadi
(74) *Attorney, Agent, or Firm* — Volpe Koenig

(57) ABSTRACT

A spindle nut (S) for a ball screw is conventionally designed as a hollow cylinder with a central-symmetrical middle longitudinal axis (Z). The spindle nut has an internal thread, which is designed as a ball groove (K) arranged on the cylinder inner surface. Pairs of load-relief bores (B) serve as substantially cylindrical channels for guiding the balls out of and into the ball channel (K) through the wall of the spindle nut. Each load-relief bore (B) is distinguished by a generatrix (L), which has an intersection point (C) with the thread base line of the ball channel (K) and constitutes the geometric continuation of the traveling path of a ball from the ball channel (K) into the load-relief bore (B). A tangent (T) to the cylinder surface (G) runs in a parallel manner at a spacing a >0 to the generatrix (L), both T and L being perpendicular to a common normal (R) to the middle longitudinal axis (Z).

8 Claims, 2 Drawing Sheets

BALL SCREW AND SPINDLE NUT THEREFOR

INCORPORATION BY REFERENCE

The following documents are incorporated herein by reference as if fully set forth: European Patent Application No. 20197576.0, filed Sep. 22, 2020.

TECHNICAL FIELD

The present invention relates to a ball screw and in particular to the spindle nut of a ball screw.

BACKGROUND

A rolling-ring screw with balls as rolling bodies is usually referred to as a recirculating ball spindle or else a ball screw. Included among the main constituent parts of a ball screw are a threaded spindle with an external thread and a spindle nut which engages around this spindle and has an internal thread. The thread flights of the threaded spindle as well as those of the spindle nut are in the form of ball grooves with a suitable profile and are matched in a complementary manner to one another such that together they form a tunnel-shaped ball channel or a ball guide in the assembled state. By contrast to a screw/nut connection, in which the thread flanks slide on one another in a planar manner, in the case of the ball screw the recirculating balls in the thread take up the transmission of load between nut and spindle. The planar sliding movement is thus replaced by a rolling movement, this being associated with reduced friction.

In order to obtain a closed recirculation path for the balls, ball returns are used. Said ball returns have the task of lifting out the balls from the ball channel between spindle nut and threaded spindle at a first location and feeding them back at a second location. The ball return thus constitutes a bypass, which bridges one or more thread flights of the nut/spindle system and thus enables a closed recirculation path for the balls of a ball screw. A ball return conventionally consists of a first ball deflection (from the ball channel), a transfer channel and a second ball deflection (into the ball channel). In general, the balls are lifted radially outwardly out of the ball channel and guided inside or outside the spindle nut in the transfer channel (e.g. a groove or a tube), before they are inserted through the second ball deflection back into the ball channel between threaded spindle and spindle nut at the location provided for this purpose.

From a technical perspective, a ball screw operates as a screw drive, which can convert a rotational movement into a longitudinal movement, or vice versa, the step-down or step-up ratio being determined by the dimensioning of the threaded spindle and the pitch of the thread. Ball screws can fundamentally be operated in two modes. If the spindle nut is mounted in a positionally fixed but rotatable manner, the threaded spindle however being mounted in a rotationally fixed but longitudinally displaceable manner, the threaded spindle moves along its longitudinal axis as soon as the nut is driven. In the second case, the threaded spindle is mounted in a positionally fixed but rotatable manner, and the spindle nut is mounted in a rotationally fixed and longitudinally movable manner. In the case of a driven threaded spindle, this leads to a linear movement of the spindle nut along the threaded spindle.

Ball screws are used in many technical applications, primarily in mechanical engineering and there preferably in machine tools. Ball screws are increasingly however also being used as longitudinal drives in sectors where previously hydraulic or pneumatic systems were used, e.g. in presses, injection molding machines and power steering systems. Moreover, ball screws also play an increasing role in electromechanical and electrohydraulic braking systems, where ball screws are used as a replacement for hydraulic brake cylinders or in parallel with known braking systems in the case of braking assistance systems. There, driven by electric motors, they help to increase the braking force of a driver or, as part of a safety system, they help to introduce or to assist an (emergency) braking operation. Purely electrically operated braking systems with ball screws as brake cylinder replacements on each wheel are thus also possible.

During operation, various forces act on the balls. Depending on the drive direction and load, they are thus pressed against different flanks of the ball channel and are therefore under compressive stress. This results in this compressive stress being released at the locations at which the balls are lifted out of the ball channel between the spindle and the nut. However, in practice it is not possible for this load-relieving operation to be continuous, such that the ball simply rolls or slides into the ball return. Rather, the more or less abrupt or stepwise relief of load produces a resultant force, which catapults the ball into the ball deflection and/or the transfer channel. This behavior can lead to excessive wear of the ball or of the ball deflection and/or creates a disruptive noise during operation and/or undesired vibrations. This behavior is summarized by the term NVH for noise, vibration, harshness. In particular in automotive construction, NVH is considered to be a problem because it could give the user the impression of a lack of quality or (the beginning of) a defect, even if there is not actually any technical problem.

PRIOR ART

Various approaches are known in the prior art in order to improve the relief of load of a ball at the ball deflection. One approach is to configure a ball deflection such that it begins as a channel or tube which is precisely tangentially matched to the ball channel of the encompassing spindle nut. Producing the bore required for this through the spindle nut is, however, technically challenging.

DE 10 2004 025 683 similarly describes providing the ball groove in the spindle nut and the ball inlet with the same cross-sectional profile.

Document DE OS 36 35 212 proposes configuring the outside of the return channel following the passages leading out of the spindle nut such that the center line of said return channel describes a specifically three-dimensional spatial curve.

DE 10 2011 076 438 proposes widening the inlet or outlet region for the balls from the thread turn.

A common aspect of all the variants in the prior art is that they are complex and/or expensive to produce. There is therefore a need for a spindle nut having a ball deflection which improves the relief of load of the balls in terms of NVH criteria and at the same time permits efficient production.

SUMMARY

A spindle nut having a ball deflection which improves the relief of load of the balls in terms of NVH criteria and at the same time permits efficient production is provided by the use of one or more of the features described herein. Advantageous configurations of the invention are specified below and in the claims.

A spindle nut for a ball screw comprises a substantially hollow-cylindrical workpiece of metal having an outer lateral surface MA and a central-symmetrical middle longitudinal axis Z. Attachment parts on the spindle nut, such as flanges, mounts and drive elements, are not taken into account here. Located on the (hollow) cylinder inner surface is a ball groove K, which is arranged in the manner of a thread and is designed to receive balls of diameter d, an inner cylinder surface G being defined by the helical thread base line of the ball groove K. Since the cylinder inner surface with the ball groove has a three-dimensional surface structure, this cylinder surface G is used as a reference surface for the subsequent statements.

As mentioned above, the ball groove K in the spindle nut forms the ball channel together with the complementarily designed ball groove of the spindle nut (in the assembled state).

The spindle nut also has straight, substantially cylindrical load-relief bores B, which are fitted in pairs and are installed as channels for guiding the balls out of and into the ball channel through the wall of the spindle nut. Each load-relief bore B is distinguished by a generatrix L, which has an intersection point with the thread base line of the ball groove K and constitutes the continuation (from a geometrical or technical perspective) of the traveling path of a ball from the ball channel or the ball groove K into the load-relief bore B. It should be noted in this respect that the generatrix L has a straight course at least initially, and therefore the position of the generatrix L can be geometrically unambiguously established from the intersection point of L with G and the subsequent distinction can be made unambiguously.

The load-relief bore is preferably bored and/or milled directly into the spindle nut in all of the designs described here, and therefore directly fulfils the guiding-in/guiding-out function. In a technically equivalent manner, the geometry described could also be realized with a shaped workpiece of plastic, metal (casting, 3D printing) or a similarly dimensionally stable material, which shaped workpiece is inserted into a correspondingly dimensioned cutout in the wall of the spindle nut. This would not lessen the advantages of the geometry described. Furthermore, it is also conceivable to realize the load-relief bore in the wall on the inner side, as described, but on the outer side of the spindle nut it transitions into a shaped part, which may also be manufactured e.g. integrally with the transfer channel. Plastic, metal or combinations thereof may also be used here.

In this respect, the load-relief bores are not to be understood to mean purely cylindrical bores, but may also have elliptical or unround cross sections. This has no relevance for the establishment of L and the intersection point with K.

If these geometric specifications are followed, it is now possible to define a tangent T which nestles against the cylinder surface G on one side and also runs in a parallel manner at a spacing $a > 0$ to the generatrix L, both T and L being perpendicular to a common normal R to the middle longitudinal axis Z.

In a further embodiment, T and L are perpendicular to a plane E. The plane E is coplanar with the middle longitudinal axis Z of the spindle nut, and the normal R likewise lies in this plane. Expressed differently, R and Z define the plane E.

The spacing a between the two parallel lines T and L amounts to between a fifth and a third of the ball diameter d. The ball diameter d was selected as a scale or comparison for the dimensioning of the invention because this makes it possible to describe a broad applicability irrespective of the dimensioning of the spindle nut or the thread helix. A preferred relationship for a has proven to be $\frac{1}{5}d < a < \frac{1}{3}d$. A value of a which amounts to 25%+/−3% of the ball diameter d is particularly preferred.

A value of $a > 0$ thus clearly means that the raceway of the balls in the load-relief bore B does not run perfectly tangentially—and therefore without a bend—but rather that a defined point, C, as the intersection point between K and L marks the transition. The direction of the load-relief bore, more precisely the angle of the bore in the wall of the spindle nut, corresponds here to the one tangent T to the cylinder surface G, but offset radially inwardly toward the middle longitudinal axis Z by the spacing a (generatrix L).

Consideration should be given to the fact that the condition "tangent (T) to the cylinder surface (G) in a parallel manner at the spacing $a > 0$ to the generatrix (L), both T and L being perpendicular to a common normal R to the middle longitudinal axis Z" does not automatically mean that the bore or its projection onto Z is also perpendicular to the middle axis Z. In fact, the condition can also be met by a bore B which receives e.g. the pitch angle of the thread helix. Only the additional condition "T and L are perpendicular to a plane E, which is defined by the normal R and the middle longitudinal axis Z" ensures that the bores B, or the projection of their middle axes, are perpendicular to the middle longitudinal axis Z.

The invention could also be described to the extent that a step or edge of defined geometry, at which the relief of load of the ball when it transitions to the load-relieving bore effectively ends, is intentionally provided. However, said step or edge is formed, or the transition is selected, such that the NVH conditions are improved over previously known designs.

In a further embodiment, a depression has been made in the traveling path of the ball in the ball channel or the ball groove (K) over a traveling distance l before the intersection point C of K with L, such that when the ball passes through l, the radial spacing between the ball and the middle axis Z increases. For this path portion W with the traveling distance l, the following holds true: $\frac{2}{5}d < l < \frac{2}{3}d$. In other words, the ball groove K is flattened and/or widened or recessed on a short path portion W before the above-described step/edge C such that the ball is remote from the middle longitudinal axis Z. The wording "flattened and/or widened or recessed" was selected to take account of the different designs of ball grooves. The "Gothic arch" frequently used as the cross section of the ball grooves can thus be modified by widening such that the position of a circulating ball becomes further away from the middle longitudinal axis of the spindle nut. According to the invention, this hinges on the effect of changing the spacing and less on the (technically expedient and possible) method used to carry this out. FIG. 2 shows this as a depression in the traveling path, this not being meant as limiting.

When a ball is passing through W, the radial spacing t between the ball and the middle axis preferably increases by $\frac{1}{33}$ to $\frac{1}{25}$ of the ball diameter d. From a manufacturing perspective, this modification of the ball groove can be achieved by virtue of a milling operation or electrochemical deposition. With the latter, a plurality of traveling-path depressions can additionally be produced on a spindle nut with a plurality of load-relief bores B at the same time.

The transition region W with the traveling distance l from the ball groove (K) to point C includes, from a technical point of view, the helix of the internal thread of the spindle nut and not the load-relief bore B. In this lies one of the advantages of the invention, because in this way the threaded spindle is available unchanged as a counterpiece to the spindle nut even in the transition portion W and the relief of load of the balls in the portion W is achieved only by way of a small, additional step of processing the spindle nut.

In all these specifications, what is meant by the intersection point C is always the resulting intersection point of K and L; in the state of the fully processed spindle nut. Point C is—in the case of otherwise identical spindle nuts—located at a different position depending on whether and on which length the depression of the traveling path of the ball in the ball groove K is realized, or not. However, this is not a problem for a person skilled in the art in terms of the design; he will conventionally select the point C, determine the distance t, and construct the depression of the traveling path 1 from there.

As mentioned at the beginning, two load-relief bores B in the form of a guiding-in and guiding-out channel with a transfer channel arranged in between will always form a ball return. When the singular is used, described or shown in the description or the drawings, it should be understood by way of example and not as an omission.

From a manufacturing perspective, it has proven to be advantageous to produce two load-relief bores B aligned parallel to one another. This means that the same conditions always prevail for the balls when they are being relieved of load or introduced into the ball channel irrespective of the rotational direction of the ball screw. Additionally, the boring and/or milling operation can thus be realized in one chuck.

The structural designs and measures proposed by the present invention allow transitions or curve progressions which are complex to mill to be omitted. The definition of a calculated transition (bend, step) from the ball groove to the load-relief bore can be better controlled than a perfectly tangential discharge or complex transitions and radii in terms of the manufacturing tolerance and the NVH problem.

Within the meaning of the present invention, a ball screw in the basic configuration comprises a threaded spindle and a spindle nut as described previously and shown in exemplary fashion in the figures. The threaded spindle is coaxially at least partially enclosed by the spindle nut (the threaded spindle will conventionally have a greater length than does the spindle nut). A multiplicity of balls run in the intermediate space between the threaded spindle and the spindle nut on a helical ball track. A ball deflection with a transfer channel, which is arranged in or on the lateral surface of the spindle nut, has the effect of a closed ball recirculation. A ball screw may have one or more ball deflections with independent ball circuits.

In one exemplary configuration, a spindle nut was realized the ball groove of which was designed for balls with d=2.4 mm. The radius of the ball groove amounted to approx. 7.5 mm. A depression by t=0.08 mm was realized over a traveling distance 1 of 1.2 mm. The spacing a amounted to approx. 0.56 mm.

DETAILED DESCRIPTION

Figure 1:
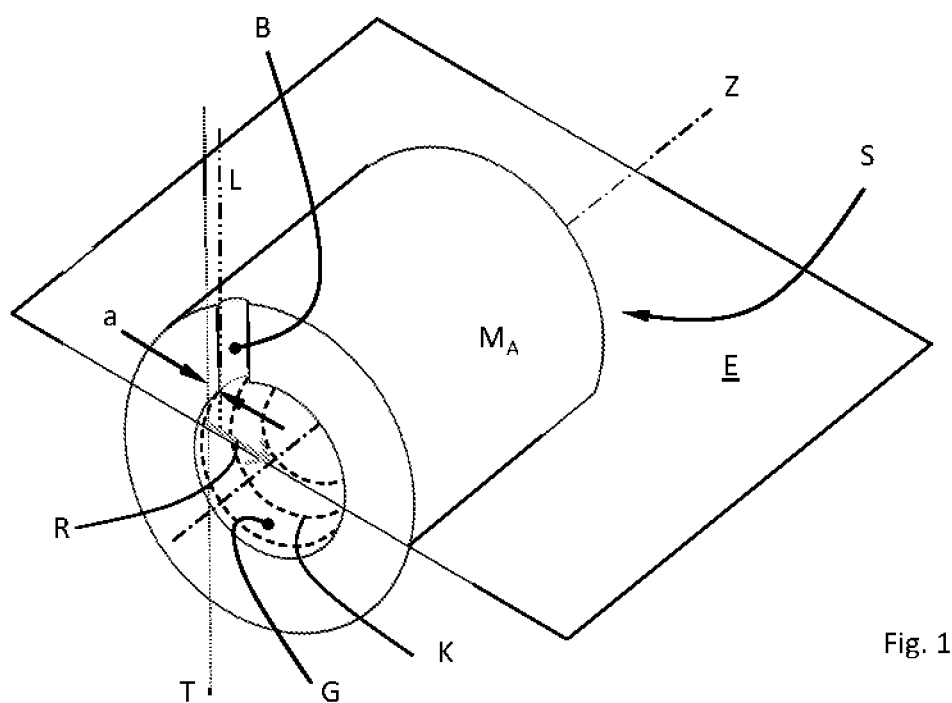
FIG. 1 shows a functional cross section through a spindle nut with details relating to the geometry.

FIG. 1 shows a cross section through a schematic spindle nut S in the form of a simple hollow cylinder with an outer surface MA. The middle longitudinal axis Z lies completely in a plane E, which congruously cuts the spindle nut S in half along the longitudinal axis Z. The helix of the ball groove K is marked on the inner surface of the hollow cylinder. The base line of this thread defines the (cylindrical) surface G. The wall of the spindle nut S is interrupted by a load-relief bore B. The generatrix L (dot-dot-dash line) which distinguishes the load-relief bore B is established by the intersection point with K. The bore is thus designed from a technical perspective such that—expressed in simple terms—the ball groove K (dashed line) continues into B along L. It can be discerned in the example shown here that the generatrix L is perpendicular to the plane E. The tangent T (dotted line) is in contact with G and is guided in a parallel manner at a spacing a. T is also perpendicular to E. Likewise indicated is the position of the normal R of T to Z, L being likewise perpendicular to said normal.

What is not shown is the variant in which T and L are perpendicular to R, but not to E. This means that the load-relief bore will have a certain tilt or deviation from the right angle to the plane. The relationship "T and L are perpendicular to R" remains in any case. The spacing A as the distance between T and L is likewise marked.

Figure 2:
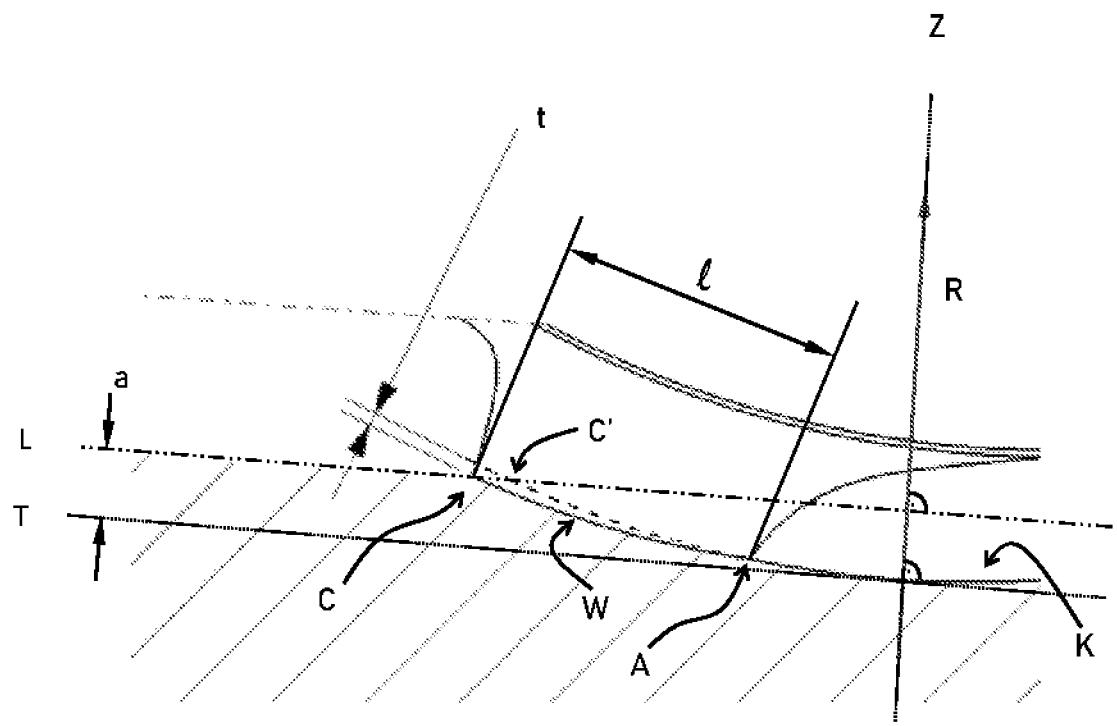
FIG. 2 shows the load-relief portion of the ball channel in detail.

FIG. 2 shows an enlarged detail of the means for guiding the ball out of the ball groove K with the depression, realized as the embodiment of the invention, of the traveling path W of the length 1. If the traveling path of a ball is viewed coming from the right (in the image), said ball is guided in the ball groove K under load until it transitions to the traveling path W, in which a depression has been made, from the point designated with A. At the end of the path W, at C, the ball transitions to the load-relief bore B and follows the traveling path L, which like W is likewise implemented in the wall of the spindle nut S. In FIG. 2, for the purpose of explanation, the point C' has also been put in, said point marking the (virtual) intersection point of L with the ball groove K in which a depression has not been made, that is to say without a portion W.

As is clear from the previous embodiments, the path portion W, in which a depression is made, is relatively short. The form of the curvature of W has therefore proved to be relatively unimportant from the perspective of NVH and manufacturing costs. W may be designed as a simple straight line, or as a curve with a constant or variable radius. Depending on the design, this may result in the course of the ball from K via W to L having at least one bend or step (at least at C), depending on the configuration of the transition from K to W, also at A.

The tangent T (dotted line) at a spacing a to L (dot-dot-dash) and the normal R to the middle longitudinal axis Z are correspondingly denoted.

Figure 3:
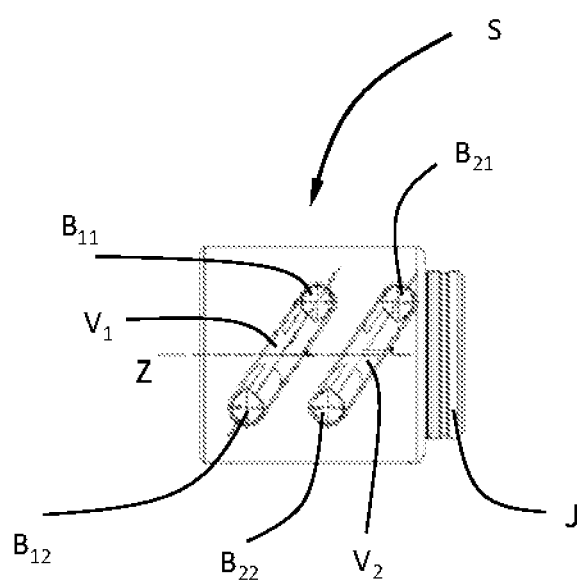
FIG. 3 shows a plan view of a spindle nut with 2 pairs of load-relief bores and a connecting channel lying between each pair.

FIG. 3 shows a plan view of a spindle nut S with two ball deflections of the type described here. Two pairs of load-relief bores $B_{11}$ and $B_{12}$ and also $B_{21}$ and $B_{22}$, which serve as guiding-out and guiding-in channels, are introduced in the outer lateral surface of the spindle nut S. $B_{11}$ and $B_{12}$ are connected by a transfer channel $V_1$, $B_{21}$ and $B_{22}$ being connected by a transfer channel $V_2$. In FIG. 3, the transfer channels V are designed as milled grooves in the lateral surface of the spindle nut. This figure makes it clear that the load-relief bores B all run in a parallel manner.

The invention claimed is:
1. A spindle nut (S) for a ball screw, comprising:
a substantially hollow-cylindrical workpiece of metal having an outer lateral surface MA and a central-symmetrical middle longitudinal axis (Z);

a ball groove (K) arranged in a manner of a thread on a cylinder inner surface that is configured to receive balls of diameter d, the inner cylinder surface (G) being defined by a helical thread base line of the ball groove (K);

ball deflections defined as straight, substantially cylindrical load-relief bores (B), that are arranged as a pair installed as channels for guiding the balls out of and into the ball channel (K) through a wall of the spindle nut, each said load-relief bore (B) being distinguished by a generatrix (L), which has an intersection point (C) with the thread base line of the ball channel (K) and constitutes a continuation of a traveling path of a ball from the ball channel (K) into the load-relief bore (B);

a tangent (T) to the cylinder surface (G) runs parallel at a spacing a >0 to the generatrix (L), with both the tangent (T) and the generatrix (L) being perpendicular to a common normal (R) to the middle longitudinal axis (Z); and a depression in the traveling path of the ball in the ball groove (K) over a traveling distance (l) before the intersection point (C) of the ball channel (K) with the generatrix (L), such that when the ball passes through the traveling distance (l), a radial spacing of the ball from the middle axis (Z) increases by a radial spacing (t), and $\frac{2}{5} d < l < \frac{2}{3} d$.

2. The spindle nut (S) as claimed in claim 1, wherein both the tangent (T) and the generatrix (L) are perpendicular to a plane (E) which is defined by the normal (R) and the middle longitudinal axis (Z) of the spindle nut.

3. The spindle nut (S) as claimed in claim 1, wherein for the spacing (a), $\frac{1}{5} d < a < \frac{1}{3} d$.

4. The spindle nut (S) as claimed in claim 1, wherein the spacing (a) is 25%+/−3% of the ball diameter (d).

5. The spindle nut (S) as claimed in claim 1, wherein the radial spacing (t) between the ball and the middle axis increases by $\frac{1}{33}$ to $\frac{1}{25}$ of the ball diameter (d).

6. The spindle nut (S) as claimed in claim 1, wherein middle axes of two load-relief bores (B) which together comprise a guiding-in and guiding-out channel, form constituent parts of a ball return, and are aligned parallel to one another.

7. A ball screw, comprising the threaded spindle and a spindle nut according to claim 1, which coaxially at least partially encloses the threaded spindle, and a multiplicity of balls, which circulate in an intermediate space between the threaded spindle and the spindle nut on the helical ball track.

8. The ball screw of claim 7, wherein there are two pairs of the ball deflections.

* * * * *